United States Patent [19]

Franklin

[11] 4,042,862
[45] Aug. 16, 1977

[54] POWER CONTROL FOR VARIABLE SPEED INDUCTION MOTORS

[76] Inventor: Robert C. Franklin, 914 Bicknell Road, Los Gatos, Calif. 95030

[21] Appl. No.: 636,195

[22] Filed: Nov. 28, 1975

[51] Int. Cl.² .............................................. H02P 5/40
[52] U.S. Cl. .................................. 318/231; 318/230; 318/227
[58] Field of Search ..................... 318/231, 230, 227

[56] References Cited

U.S. PATENT DOCUMENTS

| 3,731,169 | 5/1973 | Burgholte et al. | 318/230 |
| 3,753,064 | 8/1973 | Agarwal et al. | 318/231 |

Primary Examiner—Herman Hohauser
Attorney, Agent, or Firm—Townsend and Townsend

[57] ABSTRACT

A closed-loop induction motor power control employs a novel digital phase-locked loop which maintains a constant torque over all contemplated motor speeds. Digital processing means incorporating a novel digital phase detector employing an exclusive OR function provides a correction signal to a voltage controlled oscillator controlling the speed of the induction motor. The correction signal provided thereby is proportional to the difference between the desired slip frequency and measured slip frequency. The closed loop control system is capable of generating a constant slip frequency, either positive or negative, with respect to the rotor speed. The system is also capable of automatic shutdown and rapid response to variable-inertia loads thereby minimizing the possibility of excessive power converter current which could result in an overload shutdown as may occur during motor start up, rapid motor acceleration, or rapid increase in inertial loading.

9 Claims, 4 Drawing Figures

POWER CONTROL FOR VARIABLE SPEED INDUCTION MOTORS

BACKGROUND OF THE INVENTION

The powering of a.c. induction motors generally requires the use of a controller to furnish proper starting, stopping and reversing functions to prevent damage and excessive strain on the motor, on the motor shaft loads, and on the power system. The ideal controller would accomplish this task in a number of ways. It would limit the starting torque so that shaft loads cannot be damaged if excessive torque is applied upon starting. It would limit the starting current which would otherwise cause damage to the motor windings and possibly the power supply. And it would provide overload protection to keep the temperature rise during operation within safe limits.

A distinguishing features of the a.c. induction motor is that it is a singly-excited machine, that is, in normal use an energy source is connected to either only the stator or rotor circuit, typically the field or stator winding. Currents flowing in the field winding create a rotating magnetic field determined by the frequency of the power source applied to the field winding and by the predetermined number of magnetic poles in the machine. The frequency of the power source, therefore, defines the synchronous speed of the motor.

In an induction machine, currents are made to flow in the armature or rotor winding by induction, which creates an induced magnetic field distribution in the armature interacting with the source magnetic field distribution in the field winding to produce a net unidirectional torque. A singly-excited induction machine is capable of producing torque at any speed below synchronous speed. The ratio of the difference between the synchronous speed and the rotor speed to the synchronous speed is called the slip and is directly proportional to the motor torque. Associated with the slip is the slip frequency. It is the frequency of the induced current in the rotor of the machine. The slip frequency is directly related to the difference between the source frequency and the speed of rotor rotation.

The speed of an induction motor driving a constant inertia load may be effectively controlled in an open-loop fashion by generating an output frequency in excess of the desired rotor speed. Open-loop frequency control is unsatisfactory where variable-inertia loads are encountered or if unexpected friction loading occurs. Increase in torque causes the slip frequency to increase, which results in increased motor current at the expense of highter converter output power. If the greater torque resulting from the increased slip frequency does not accelerate the load at the necessary rate, excessive current may cause an overload shutdown of the power source.

Various schemes have been proposed to control the slip frequency in order to limit motor torque and current. Phase-locked loop systems are known for induction motor control. Such systems generally employ a voltage control oscillator driven by a tachometer output signal derived from the rotational displacement of the motor shaft utilizing some form of phase detection to establish control over the slip frequency. The prior art controllers have limited capabilities as compared to the control system herein disclosed.

SUMMARY OF THE INVENTION

According to the present invention a closed-loop induction motor power control employs a novel digital phase-locked loop which maintains a constant torque over all contemplated motorspeeds. Digital processing means incorporating a novel digital phase detector employing an exclusive OR function provides a correction signal to a voltage controlled oscillator controlling the speed of the induction motor. The correction signal provided thereby is proportional to the difference between the desired slip frequency and measured slip frequency. The closed loop control system is capable of generating a constant slip frequency, either positive or negative, with respect to the rotor speed. The system is also capable of automatic shutdown and rapid response to variable-inertia loads. Thereby minimizing the possibility of excessive power converter current which could result in an overload shutdown as may occur during motor start up, rapid motor acceleration, or rapid increase in inertial loading.

A primary object of the present invention is to provide an accurate control circuit for an a.c. induction motor which generates a constant slip frequency, either positive or negative with respect to the rotor speed, in order that the motor can rapidly respond to variations in motor load.

It is a further object of the present invention to provide a motor control circuit having the ability to rapidly re-establish a desired slip frequency after momentary power outages.

A particular object of the present invention is to provide a feed-back control for an induction motor which is sensitive to the proper polarity of the slip frequency with reference to the rotor frequency so as to disable a power converter forming a part of the load in order to prevent damage to the motor, converter, and the like due to instability in the feedback network.

The power converter according to the present invention has particular application with high-speed turbo-molecular pumps capable of producing extremely high vacuum. A turbo-molecular pump operates a turbine at extremely high rotational velocities and is subject to variable inertia loading and rapidly varying friction loading. Furthermore, turbine blades of such pumps are highly susceptible to damage due to excessive torque. Therefore, it is a particular object of the present invention to provide a power control circuit and converter suitable for controlling an induction motor driving a turbo-molecular pump.

It is a further specific object of the present invention to provide a power control circuit for driving an induction motor at high energy efficiency.

These and other objects of the present invention will be apparent upon examination of the following detailed description and accompanying drawings wherein:

DETAILED DESCRIPTION OF PREFERRED EMBODIMENTS

Figure 1:
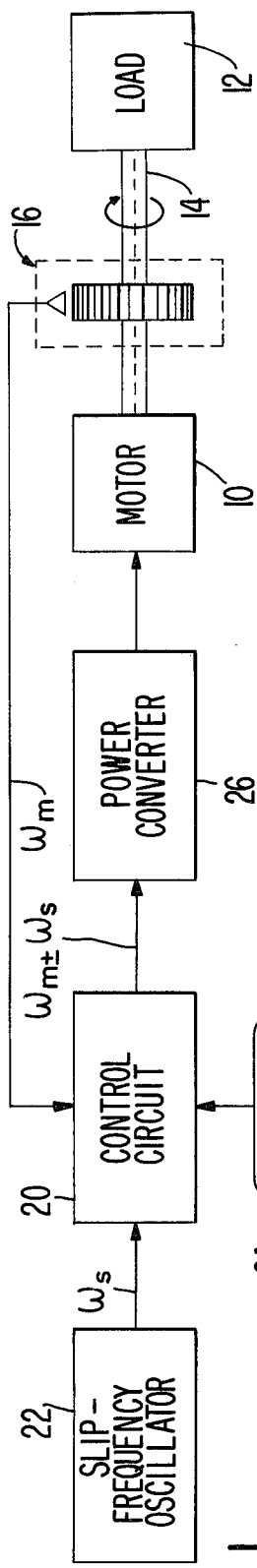
FIG. 1 is a block diagram of a closed-loop power control system for an induction motor.

Referring to FIG. 1, there is shown a block diagram of a closed loop power control system for an induction motor. An induction motor 10 is operative to drive a load 12 through a suitable coupling such as a shaft 14. A tachometer pickup 16 senses the rotational velocity of the shaft 14 and transmits a pulse train proportional to the actual, or measured, rotational velocity $\omega_m$ to a control circuit 20 hereinafter described. The slip frequency oscillator 22 is operative to provide a signal proportional to the desired slip represented as a slip frequency $\omega_s$ to the control circuit 20. A signal to indicate the operational mode of the system, i.e., positive or negative torque, may be provided by an accelerate/brake controller 24 to control circuit 20. The accelerate/brake controller 24 may be a two-position digital switch or like manually operable switch means. The control circuit 20 is operative to provide a pulse train of frequency proportional to the algebraic sum of $\omega_m$ and $\omega_s$, that is, $\omega_m + \omega_s$ during the positive torque mode and $\omega_m - \omega_s$ during negative torque mode. This pulse train is operative to drive a power converter 26 which, in turn, is operative to provide power to or to dissipate energy from the induction motor 10 as required to accelerate, decelerate or to maintain a nominal desired rotor speed.

Figure 2:
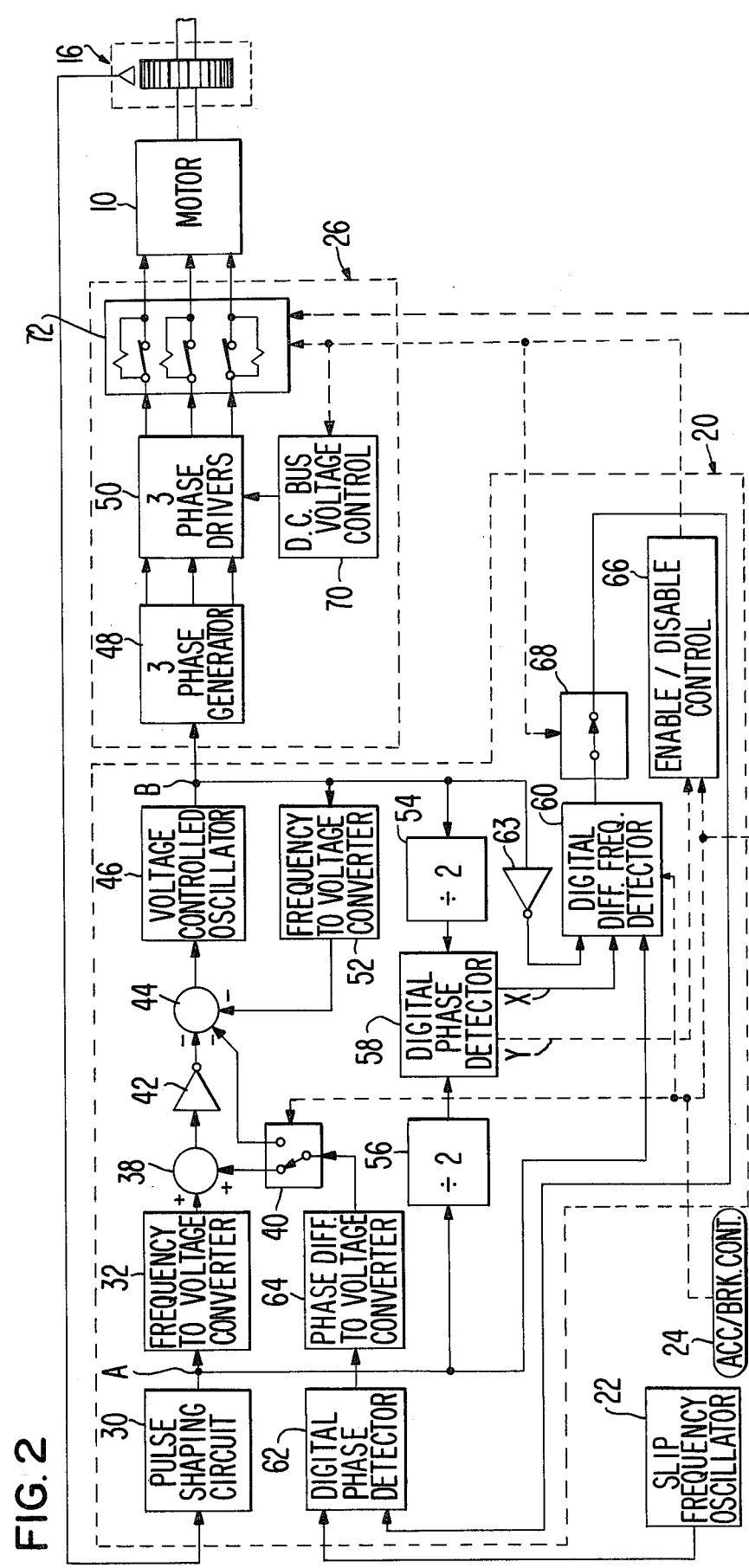
FIG. 2 is a block diagram of a control circuit according to the invention showing interconnection with a three-phase power control and induction motor system.

To illustrate the circuit operation, reference is made to FIG. 2 showing the control circuit 20 and the power converter 26 in greater detail. The pulse train from the tachometer 16 is provided to a pulse shaping circuit 30, the pulse train output of which is coupled to a first frequency-to-voltage converter 32. The fisrt frequency-to-voltage converter 32 provides a d.c. output signal proportional to the frequency of the input pulse train signal and directs it to a summer 38 which is also coupled a first terminal of an analog signal switch means 40 such as an electronic switch. The sum of the signals thereby provided by converter 32 and switch means 40 is provided to an inverter amplifier 42. The d.c. output of amplifier 42 is coupled to a second summer 44. The output of summer 44 is coupled to a voltage controlled oscillator (VCO) 46. The output of VCO 46 provides a pulse train to a three-phase generator 48 within the power converter 26 which, in turn, controls three-phase driver circuitry 50 powering the motor 10.

The output of VCO 46 is also utilized in various feedback loops as required to insure linearity and accuracy of control according to the invention as hereinafter explained.

In accordance with the invention, a frequency-to-voltage converter 52 is operative to receive the output pulse train signal from VCO 46 and to couple a d.c. feedback signal to summer 44. The feedback loop utilizing converter 52 is operative to establish a substantially linear relationship between the output frequency of VCO 46 and the output frequency of pulse-shaping circuit 30. The pluse train output of each of the circuits 30 and 46 is coupled to a divide-by-two circuit 56 and a divide-by-two circuit 54, respectively. The resulting output pulse trains from circuits 54 and 56 are half the respective input frequencies, and each has a 50% duty cycle waveform. A phase detector 58 is operative to receive and to compare the two pulse trains according to an exclusive OR function and to provide a binary output (output X) from which a beat frequency can be derived.

A digital difference frequency detector 60 is operative to receive the signal of VCO 46 through a digital inverter 63, the control output from terminal X of phase detector 58, and the output of pulse-shaping circuit 30. Utilizing these three digital output frequency signals according to the mode command of controller 24, which is coupled thereto, frequency detector 60 is operative to provide a derived beat frequency signal to a phase detector 62 for comparison with the output of slip frequency oscillator 22. A phase difference pulse train signal is coupled to a phase difference-to-voltage converter 64, the d.c. output signal of which is coupled through switch 40 into the feedback loop of VCO 46, i.e., through either of summers 38 or 44 depending on the mode command of controller 24. The above circuitry arrangement comprises a digital phase-locked loop particularly suited to the objects of the herein described invention.

A safety feature is provided by an enable/disable control 66 as explained herein below. It receives input commands from the Y terminal of digital phase detector 58 and controller 24 to provide a control command to a switch circuit represented by block 68 controlling the output of frequency detector 60 and to d.c. bus voltage control 70 and brake resistor circuitry 72 in the power converter 26.

The circuit of FIG. 2 is shown in the "accelerate", or positive torque, mode. In operation in the positive torque mode, the output frequency of VCO 46 is maintained at a frequency above the motor rotor frequency by a difference equal to the frequency of slip frequency oscillator 22. Thus, a constant torque is applied to the load independently of the rotational velocity of motor 10. The output of digital difference frequency detector 60, $\omega_{s(actual)}$, is caused by the phase locking phenomenon to track the desired output frequency $\omega_{s(desired)}$ of oscillator 22 resulting in a frequency correction signal through phase detector 62 to the output of VCO 46 until a phase-lock condition exists in the phase detector 62. In the decelerating or braking mode of operation, switch 40 redirects the frequency correction signal resulting in a relative decrease of the bias to VCO 46. Control 66 interrupts the feedback loop through switch 68, disabling bus voltage control 70 and actuating brake resistor circuitry 72 in power converter 26 to prevent producing power output to the motor 10 in the event the slip frequency is not of the proper polarity relative to the command from the controller 24.

The possibility of a phase ambiquity exists during operation if, for example, the measured rotational frequency $\omega_m$ of the motor exceeds the control frequency of VCO 46 during the positive torque mode. This causes a dangerous condition because the feedback loop is incapable of establishing a stable phase lock. In order to minimize the possibility of phase ambiguity, a safety feature through switch 68 is provided between the output of difference frequency detector 60 and the input of digital phase detector 62 which, in response to a command from control 66, locks out difference frequency detector 60 to prevent VCO 46 from tracking in the wrong operational mode.

Figure 3:
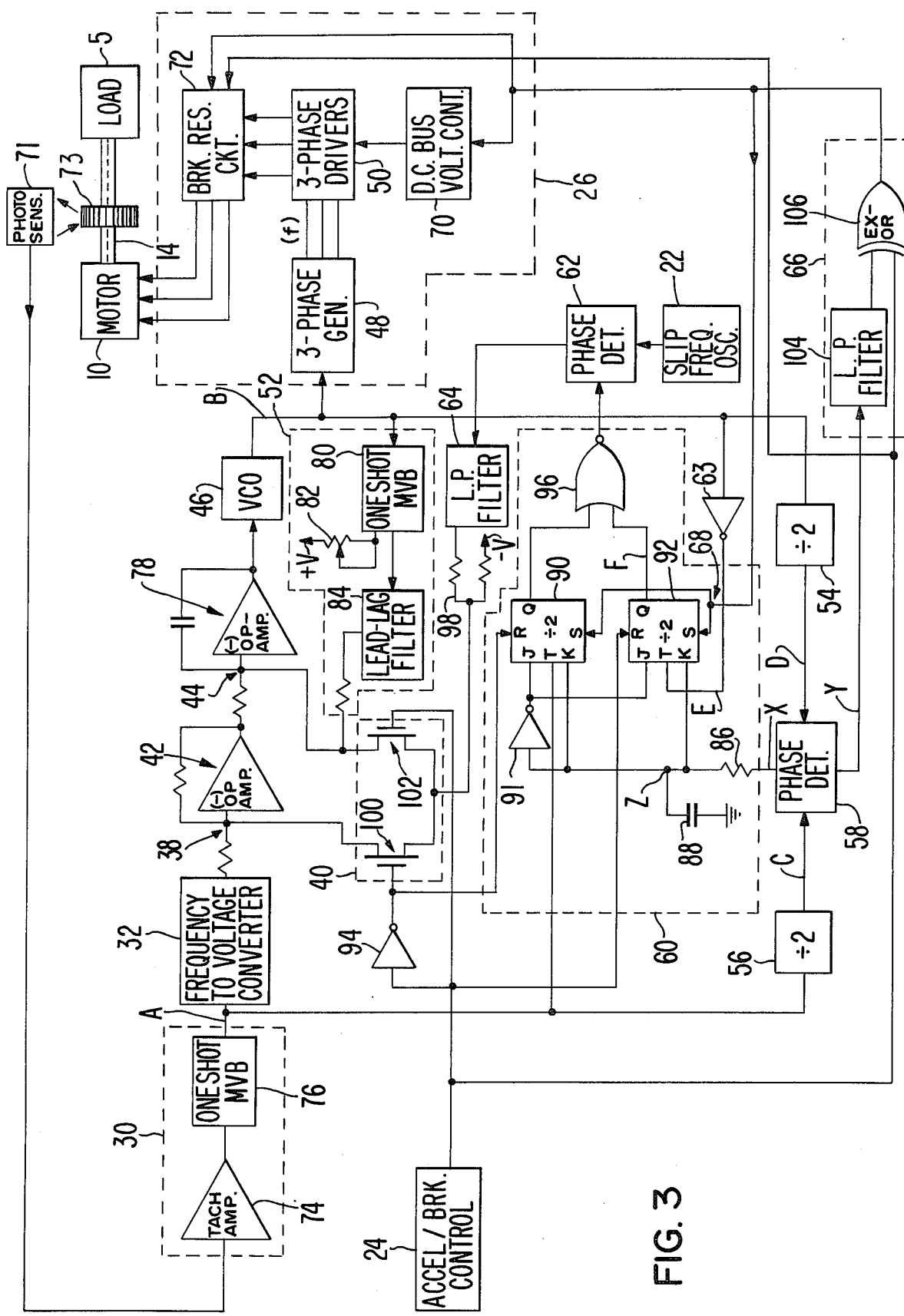
FIG. 3 is a more detailed block diagram of a slip frequency control circuit according to the present invention.
Figure 4:
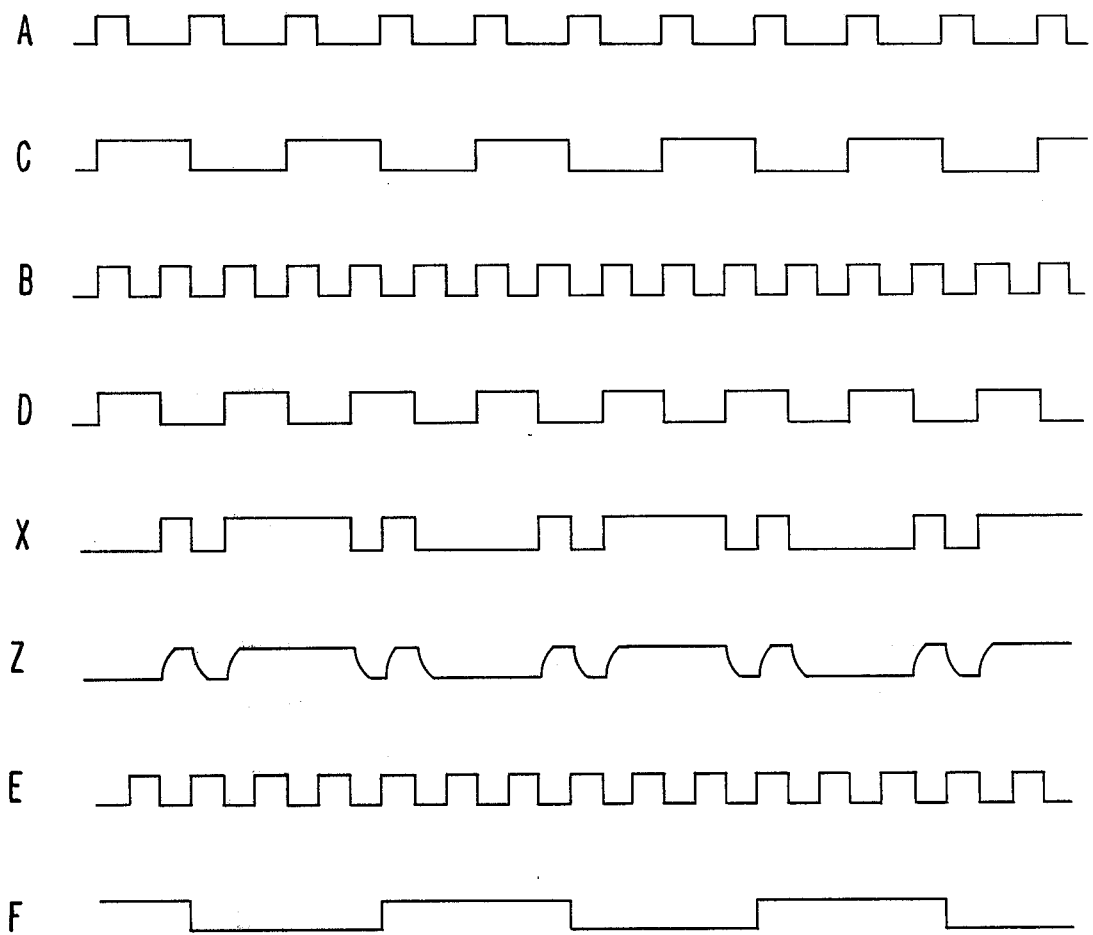
FIG. 4 is a diagrammatic representation of waveforms at the outputs of selected elements shown in FIG. 3.

The operation of control circuit 20 according to the invention may be more fully understood by reference to FIG. 3, a combination block and schematic diagram of the slip frequency control circuit 20, and to FIG. 4, illustrating waveforms at selected points in the circuit during operation in positive torque mode. The tachometer 16 may comprise a photosensor 71 which produces output pulses indicative of the rotational speed of the shaft 14 as a result of the rotation of a rotation indicator such as a notched tachometer disk 73. These output pulses are amplified by a tachometer amplifier 74 which is operative to trigger a one-shot multivibrator 76 in the pulse-shaping circuit 30. The multivibrator 76 is operative to produce a constant width and constant amplitude pulse for each input pulse as indicated by waveform A in FIG. 4. The frequency-to-voltage converter 32, which comprises a low-pass filter, is operative to average the pulse output of pulse-shaping circuit 30 to produce a d.c. current directly proportional to the input frequency which is provided to the input summing junction 38 of the amplifier 42. Amplifier 42 is operative to invert its input voltage and to apply the resulting d.c. output voltage to the summing junction 44 of an integrating amplifier 78. The inverted output voltage in the positive torque mode is operative to produce an increase in the output frequency of VCO 46 as the output voltage becomes more positive.

Frequency-to-voltage converter 52 in a high-speed negative feedback loop is operative to provide pulse shaping improving the linearity of the resultant signals. Converter 52 comprises a one-shot multivibrator 80 with pulse width adjustment 82 and a lead-lag filter 84.

In operation, as the output frequency of VCO 46 is increased, the frequency of multivibrator 80 is increased. Filter 84 provides a d.c. current to summing junction 44, which current is proportional to the output frequency of multivibrator 80, and which opposes the inverted output voltage of amplifier 42. This is a known method for linearizing a voltage-to-frequency converter and to provide for a constant relationship between the tachometer signal output (waveform A, FIG. 4) and the output of VCO 46 (waveform B). Further accuracy and independence from temperature variations can be achieved by utilizing an integrated circuit containing the multivibrator 76 and multivibrator 80 on the same chip.

The pulse output waveforms B and A are applied to binary dividers 54 and 56, respectively. The resulting output pulse trains each exhibit a 50% duty cycle (waveforms C and D). The signals are compared in the digital phase detector 58 by means of an exclusive OR logic function to produce output waveform X as shown in FIG. 4.

The X output of phase detector 58 is provided to the digital difference frequency detector 60 which is operative to delay the signal slightly by RC network 86, 88 to improve triggering to produce waveform Z. The signal thereby provided is applied preferably to the K inputs of a first and a second J-K multivibrator 90 and 92, respectively. An inverter 91 is operative to invert the resultant signal (Z) and to apply it to the J inputs of multivibrators 90 and 92, respectively. The output A of monostable multivibrator 76 is coupled to the Toggle input of multivibrator 90 and the output signal B of VCO 46 is provided through inverter 63 (waveform E) to the toggle input of multivibrator 92. Difference frequency detector 60 is so constructed that only one of the multivibrators 90 or 92 is active at one time. For example, controller 24 is operative to provide a logical ZERO to indicate accelerate mode. An inverter 94 coupled between controller 24 and the R terminal of multivibrator 90 is operative to lock multivibrator 90 in Reset by a positive signal to the R terminal, thus holding the Q output terminal to a logical ZERO. Waveform F in FIG. 4 illustrates the output signal of multivibrator 92. It can be seen that the output of multivibrator 92 (waveform F) changes state on the positive-going edge of the inverted output of VCO 46 through inverter 63 (waveform E), as indicated by the state of the output X delayed by network 86, 88 (waveform Z) of phase detector 58. Output waveform F is the computed or actual slip frequency, $\omega_{s(actual)}$, signal of the motor 10.

The measured slip frequency signal is conveyed through a NOR gate 96 to phase detector 62 to which is also coupled the output of slip frequency oscillator 22 operating at the desired slip frequency, $\omega_{s(desired)}$. Phase detector 62 is operative to compare $\omega_{s(desired)}$ and $\omega_{s(actual)}$ to provide a signal to phase difference-to-voltage converter 64, embodied as a lowpass filter. If $\omega_{s(desired)}$ is greater than $\omega_{s(actual)}$, the output from converter 64 will become more positive and cause a resulting current to flow through a resistor 98 coupled through switch 40 into the "slow" response VCO 46 feedback loop.

In the preferred embodiment, switch 40 comprises an FET switch 100 in combination with an FET switch 102. In the accelerate mode, switch 100 is ON, permitting current flow to the input summing terminal of amplifier 42. A positive current flow will cause the output of integrating amplifier 78 to become more positive, thus increasing the output frequency of VCO 46 and thereby increasing the frequency B. A frequency correction continues until frequency B equals the desired slip frequency plus the motor rotor frequency ($\omega_m + \omega_s$) at which point a phase lock condition exists in phase detector 62.

During the brake mode, the circuitry is transposed such that multivibrator 90 is activated so that pulse train control is provided through tachometer frequency A. In addition, the output of converter 64 is applied through switch 102 to summing terminal 44 so as to provide a less positive correction voltage to VCO 46, relative to that correction voltage obtained in the acceleration made.

Commercially available integrated circuits may be utilized as circuit elements in the system herein disclosed. For example, phase detector 58 may be a type CD 4046 integrated circuit manufactured by RCA Corporation, B2 Rockeller Plaza, New York City, or its equivalent.

A further feature of the invention is the enable/disable control 66 which is a means for disabling the power converter and phase lock loop control if the slip frequency is of an improper polarity relative to the rotor frequency. For example, if controller 24 provides a signal indicating an acceleration mode (a logical ZERO output), but through some failure the slip frequency is in fact negative, circuit damage could result because the motor would appear as an a.c. generator without means for dissipating energy in the power converter. The generated voltage would increase to the point of circuit destruction or until over-voltage shutdown circuitry is activated. Disable control 66 comprises a lowpass filter 104 to which is coupled a phase sensitive output Y of phase detector 58 and an exclusive OR gate 106, to which is coupled the output of low pass filter 104 and the control signal from accelerate/break controller 24. The output Y produces a 50% duty cycle signal when no frequency differing exists but 90° phase difference exists at the input of detector 58. Disable control 66 operates as follows, if controller 24 is operative to provide a logical ZERO to exclusive OR gate 106 indicating accelerate mode: if the rotor frequency (waveform C) exceeds the VCO frequency (waveform D), a negative slip condition exists. The Y output of phase detector 58, as filtered through lowpass filter 104, becomes positive. Exclusive OR gate 106 thereupon is operative to provide a logical ONE to multivibrators 90 and 92, disabling the phase lock loop. Gate 106 is further operative to provide a signal to power converter 26 causing the interruption of d.c. bus voltage through controller 70 and the insertion of load dissipating resistors in brake resistor circuit 72. Similarly, in brake mode, a signal is provided from controller 24 to the brake resistor circuit 72 of power converter 26 which places the brake resistors in series with each motor phase and provides for controlled deceleration of the motor 10. It should be noted that the signal to the S terminals of multivibrators 90 and 92 provide the function of disabling switch 68 described in conjunction with FIG. 2.

The invention has been described in connection with a three-phase induction motor control system. The invention is also operative in connection with other types of induction machines. For ease of explanation all the above mentioned frequencies were considered to be as indicated but in actual fact the frequency of operation of the particular circuit herein described exceeds by six times the actual rotational frequency of the motor being controlled. This should be apparent from the circuit because of the utilization of a three-phase generator 48 which divides its input frequency by six and should not be considered a limiting feature of the invention.

In summary, a three-phase motor control has been described which modifies the output frequency of a voltage controlled oscillator such that the output frequency is either higher or lower than a variable input frequency by a fixed amount, called a slip frequency. A digital difference-frequency detection system employing an exclusive OR function produces a resultant output which is compared with a standard frequency representing the desired slip frequency, by means of a phase detector. The resultant correction signal adjusts the voltage controlled oscillator until a phase lock condition is established. The response time to input frequency fluctuations is very rapid, and the linearity of the voltage controlled oscillator is relatively good which, therefore, does not place stringent response requirements on the phase locked loop for contemplated input frequency variations. Further, a protection circuit has been described for disabling the power converter and inserting brake resistors whenever there exists an unstable relation between the existing and desired slip frequency polarity.

The invention has been described in conjunction with particular embodiments. Minor modifications and variations will be apparent to those of ordinary skill in the art. It is not intended that the invention be limited except as defined by the appended claims.

I claim:
1. A closed-loop power control for a variable speed induction motor comprising:
   means for providing a first pulse train having a frequency proportional to the actual rotational frequency of said motor;
   means for providing a second pulse train having a frequency proportional to a desired slip of said motor;
   means operative in response to an input signal from at least said first pulse train providing means for providing a third pulse train output signal to control said motor speed;
   means operative to compare the phase of said first pulse train with the phase of said third pulse train for providing a fourth pulse train having a frequency proportional to the actual slip of said motor;
   means operative to compare the phase of said fourth pulse train with the phase of said second pulse train for generating a correction signal proportional to the difference frequency therebetween; and
   means operative to combine said correction signal and an input signal from at least said first pulse train providing means in a close phase-locking loop for maintaining said third pulse train output signal in proportion to the algebraic sum of said actual motor rotational velocity and said desired motor slip.

2. A closed-loop power control for a variable speed induction motor according to claim 1 wherein said fourth pulse train providing means is operative to compare said first pulse train and said third pulse train according to an exclusive OR logic function.

3. A closed-loop power control for a variable speed induction motor according to claim 1 further comprising means for establishing a positive torque operational mode and a negative torque operational mode.

4. A closed-loop power control for a variable speed induction motor according to claim 3 wherein said fourth pulse train providing means comprises:
   means operative to compare a first 50% duty cycle square wave pulse train representative of one-half of the output frequency of said third pulse train providing means with a second 50% duty cycle square wave pulse train representative of one-half the output frequency of said first pulse train providing means according to the exclusive OR logic function for producing a beat frequency square wave pulse train;
   means for delaying said best frequency square wave pulse train and for coupling said delayed pulse train to first input terminal means and corresponding complementary input terminal means of J-K multivibrator means;
   means operative to couple an output pulse train representative of the output frequency of said third pulse train providing means to toggle input terminal means of said J-K multivibrator means only during positive torque mode for producing said fourth pulse train having a frequency proportional to the actual positive slip; and
   means operative to couple an output pulse train representative of the output frequency of said first pulse train providing means to said toggle input terminal means of said J-K multivibrator means only during negative torque mode for producing said fourth output pulse train having a frequency proportional to the actual negative slip.

5. A closed-loop power control for a variable speed induction motor according to claim 4, wherein said J-K multivibrator means includes a first J-K multivibrator operative in response to the positive torque mode control command and a second J-K multivibrator operative in response to the negative torque mode control command, the respective output signals of said first and second multivibrators being alternately coupled to said fourth pulse train providing means in response to said control commands.

6. A closed-loop power control for a variable speed induction motor according to claim 5, wherein said signal combining means comprises:

- electronic switch means for providing a first alternate signal path only during a first operational mode and a second alternate signal path only during a second operational mode for a first analog signal from said correction signal providing means;
- means operative to combine said first analog signal received through said first alternate signal path with a second analog signal proportional to the output frequency of said first pulse train providing means and to invert the resultant combined signal only during said first operational mode;
- means operative to combine said first analog signal received through said second signal path and to combine said first analog signal with an inverted representation of said second analog signal only during said second operational mode; and
- means operative to integrate the combined first analog signal and second analog signal for providing said input signals to said third pulse train output signal control means.

7. A closed-loop power control for a variable speed induction motor according to claim 4, further comprising:

- means for disabling said correction signal providing means and the power source for said induction motor in response to a phase indicating signal from said beat frequency producing means and in response to a signal from said operational mode switch means upon indication of an unstable operating condition.

8. A closed-loop power control for a variable induction motor according to claim 7, wherein said unstable operating condition is determined by comparison between the output signal of said beat frequency producing means and the operational mode signal of said operational mode switch means according to the exclusive-OR logic function.

9. A closed-loop power control for a variable speed induction motor according to claim 1, further comprising:

- means for disabling said correction signal providing means and the power source for said induction motor upon occurrence of an unstable operation condition caused by a reversal in phase between the output signal of said first pulse train providing means and the output signal of said third pulse train providing means.

* * * * *